(12) United States Patent
Poor

(10) Patent No.: US 7,417,774 B2
(45) Date of Patent: Aug. 26, 2008

(54) METHOD AND APPARATUS FOR SELECTIVE PROCESSING OF CAPTURED IMAGES

(75) Inventor: David D. S. Poor, Meadowbrook, PA (US)

(73) Assignee: CTB/McGraw-Hill LLC, Monterey, CA (US)

( * ) Notice: Subject to any disclaimer, the term of this patent is extended or adjusted under 35 U.S.C. 154(b) by 921 days.

(21) Appl. No.: 10/344,378

(22) PCT Filed: Aug. 2, 2001

(86) PCT No.: PCT/US01/24464

§ 371 (c)(1),
(2), (4) Date: Feb. 11, 2003

(87) PCT Pub. No.: WO02/15558

PCT Pub. Date: Feb. 21, 2002

(65) Prior Publication Data

US 2004/0126036 A1 Jul. 1, 2004

Related U.S. Application Data

(60) Provisional application No. 60/224,327, filed on Aug. 11, 2000.

(51) Int. Cl.
*H04N 1/04* (2006.01)

(52) U.S. Cl. .................. 358/474; 358/483; 358/512; 358/530; 358/518; 382/287; 382/317; 382/306; 705/12

(58) Field of Classification Search .................. 358/483, 358/512, 517, 518, 530; 382/162, 165, 167, 382/170, 317, 287, 291, 322, 321, 100, 306; 705/12
See application file for complete search history.

(56) References Cited

U.S. PATENT DOCUMENTS

| | | | |
|---|---|---|---|
| 4,300,123 | A | 11/1981 | McMillin et al. |
| 4,478,584 | A | 10/1984 | Kaney |
| 4,708,503 | A | 11/1987 | Poor |
| 4,760,464 | A | 7/1988 | Sakano |
| 4,857,715 | A | 8/1989 | Koch et al. |
| 4,937,439 | A | 6/1990 | Wanninger et al. |
| 4,978,305 | A | 12/1990 | Kraft |

(Continued)

FOREIGN PATENT DOCUMENTS

WO  WO 02/15170 A2  2/2002

(Continued)

*Primary Examiner*—Edward L. Coles, Sr.
*Assistant Examiner*—Negussie Worku
(74) *Attorney, Agent, or Firm*—Rothwell, Figg, Ernst & Manbeck, PC

(57) ABSTRACT

Methods and apparatus are disclosed for identifying intended response marks in an optically scanned image of a response sheet having key marks and response targets printed in the same color. Pixel darkness values assigned by a digital imaging scanner are used to locate key marks and response targets and to identify response marks. Areas of the sheet may be selectively filtered to mask the response targets. Alternatively, a color imaging scanner may be used to produce a set of color values, such as RBG values, for each pixel. Software can act as a virtual filter by using the RBG values to detect or to mask a color in the image.

4 Claims, 5 Drawing Sheets

U.S. PATENT DOCUMENTS

| | | | |
|---|---|---|---|
| 5,001,330 A | 3/1991 | Koch | |
| 5,001,769 A | 3/1991 | Reid-Green et al. | |
| 5,004,896 A | 4/1991 | Serrell et al. | |
| 5,011,413 A | 4/1991 | Ferris et al. | |
| 5,085,587 A | 2/1992 | DesForges et al. | |
| 5,099,340 A | 3/1992 | Kamada et al. | |
| 5,103,490 A | 4/1992 | McMillin | |
| 5,134,669 A | 7/1992 | Keogh et al. | |
| 5,140,139 A | 8/1992 | Shepard | |
| 5,184,003 A | 2/1993 | McMillin et al. | |
| 5,194,966 A | 3/1993 | Quardt et al. | |
| 5,211,564 A | 5/1993 | Martinez et al. | |
| 5,291,592 A | 3/1994 | Kita | |
| 5,318,465 A * | 6/1994 | Boyle et al. | 439/741 |
| 5,371,673 A | 12/1994 | Fan | |
| 5,420,407 A | 5/1995 | Grundy, Jr. | |
| 5,434,931 A | 7/1995 | Quardt et al. | |
| 5,452,379 A * | 9/1995 | Poor | 382/317 |
| 5,664,076 A | 9/1997 | Pluta et al. | |
| 5,672,060 A | 9/1997 | Poor | |
| 5,711,673 A | 1/1998 | Grundy, Jr. | |
| 5,869,789 A | 2/1999 | Reid-Green | |
| 5,873,077 A | 2/1999 | Kanoh et al. | |
| 5,991,595 A | 11/1999 | Romano et al. | |
| 6,079,624 A | 6/2000 | Apperson et al. | |
| 6,173,154 B1 | 1/2001 | Kucinski et al. | |
| 6,256,399 B1 | 7/2001 | Poor | |
| 6,289,125 B1 * | 9/2001 | Katoh et al. | 382/194 |
| 6,295,439 B1 | 9/2001 | Bejar et al. | |
| 6,366,760 B1 | 4/2002 | Kucinski et al. | |
| 6,411,725 B1 * | 6/2002 | Rhoads | 382/100 |
| 6,459,509 B1 | 10/2002 | Maciey et al. | |
| 6,466,683 B1 | 10/2002 | Poor | |
| 6,526,258 B2 | 2/2003 | Bejar et al. | |
| 6,532,077 B1 * | 3/2003 | Arakawa | 358/1.13 |
| 6,552,829 B1 | 4/2003 | Maciey et al. | |
| 6,558,166 B1 * | 5/2003 | Clark et al. | 434/322 |
| 6,628,834 B2 * | 9/2003 | Gotsman et al. | 382/209 |
| 6,684,052 B2 | 1/2004 | Kucinski et al. | |
| 6,961,482 B2 | 11/2005 | Knowles | |
| 6,963,425 B1 * | 11/2005 | Nair et al. | 358/1.9 |
| 6,988,895 B1 | 1/2006 | Lamarche et al. | |
| 7,020,435 B2 | 3/2006 | Moulthrop et al. | |
| 7,054,464 B2 | 5/2006 | Poor | |
| 7,095,979 B2 | 8/2006 | Stout | |
| 2002/0110798 A1 | 8/2002 | Kucinski et al. | |
| 2002/0122606 A1 | 9/2002 | Knowles | |
| 2003/0086586 A1 | 5/2003 | Poor | |
| 2004/0086841 A1 | 5/2004 | Clark et al. | |
| 2004/0185424 A1 | 9/2004 | Kucinski et al. | |
| 2004/0259067 A1 | 12/2004 | Cody et al. | |
| 2007/0008564 A1 | 1/2007 | Friedman et al. | |

FOREIGN PATENT DOCUMENTS

WO     WO 02/15170 A3     2/2002

* cited by examiner

| SCANNER 10 | Provide a digital imaging scanner having a light source and sensor for detecting light reflected off the sheet. |
|---|---|
| FILTER 20 | Provide a color filter in the color of the key marks and response targets. |
| FILTER 30 | Arrange filter in relation to the sheet as it passes through the scanner so that light reflected from the section containing key marks is not filtered and light reflected from the response targets is filtered. |
| SHEET 40 | Scan the sheet with a digital imaging scanner. |
| PIXEL DARKNESS VALUES 50 | Use gray scale values to locate key marks in the captured image. |
| KEY MARKS 60 | Calculate, from the location of the key marks in the image, an expected location of response targets in the image. |
| RESPONSE MARKS 70 | Use gray scale values to identify an intended response mark at the expected location of a target. |

FIGURE 1

| SCANNER 1000 | Provide a digital imaging scanner capable of capturing an image of a response sheet with a RGB value assigned to each pixel corresponding to the color of that pixel. |
|---|---|
| SHEET 2000 | Provide a response sheet having key marks and response targets printed in the same color. |
| IMAGE 3000 | Capture, with the scanner, a digital image of the sheet with a RGB value assigned for each pixel corresponding to the color of that pixel. |
| KEY MARKS/ RESPONSE TARGETS 4000 | Use a RGB value in the color of the key marks/response targets to locate key marks/response targets in the captured image. |
| RESPONSE TARGETS 5000 | Calculate from the location of the key marks/response targets in the image an expected location of response targets in the image. |
| RESPONSE MARKS 6000 | Use a RGB value corresponding to any color other than the color of the target to identify an intended response mark at the expected location of a target. |

FIGURE 3

METHOD AND APPARATUS FOR SELECTIVE PROCESSING OF CAPTURED IMAGES

RELATED APPLICATIONS

This application claims a priority filing date based upon provisional patent application Ser. No. 60/224,327, filed Aug. 11, 2000.

BACKGROUND OF THE INVENTION

1. Field of the Invention

This invention relates to the general field of optical scanning to collect data and digital images from documents, and within that field to the more specific field of scanning wherein the colors printed on a sheet may be selectively processed so that key marks and response targets may be printed in the same color. Although the methods and apparatus described herein may be useful in other related tasks, the most common usage is likely to be in the processing and scoring of standardized assessment tests, and particularly for OMR (Optical Mark Recognition).

2. Description of the Prior Art

Traditional OMR processes, in which respondents place marks on forms or sheets, require that such forms be manufactured to precisely comply with very tight design tolerances. Most response sheets for use with traditional OMR systems have targets printed, typically in the shape of a circle, with a special ink to show respondents where to make marks. This special ink absorbs little or no light in the spectrum processed by the optical system, instead reflecting it to the scanning camera in close to the same intensity as a white area of the sheet. If no response mark is made in the target area, the scanning system produces a pixel image of the area as not having any mark, just as if the paper were blank throughout the area. Many OMR systems use the red or infrared spectrum for processing and red ink for the targets, since the red ink highly reflects incident light in the infrared spectrum while pencil marks highly absorb the infrared light.

Sophisticated OMR systems also use key marks for location and orientation, including a special form of key marks known as timing tracks that indicate the scanning speed by the distance between track marks in the image. These key marks are printed in a second ink, typically black, that highly absorbs light in the appropriate color spectrum and therefore can be recognized and processed by the optical system. The ink used to print key marks may also be used to print other marks to identify the type of form and/or to identify the particular document. The various inks used for the targets, and other inks used for key marks and identification marks, are well known in the art. However, the requirement of using two separate inks on the same form and the degree of printer control necessary to ensure that the two inks are properly in register of each other makes OMR form printing an exacting and expensive process.

An advantage exists, therefore, for an optical scanning method and apparatus capable of OMR processing of sheets that have response targets and key marks printed in the same color. This would allow the response sheets to be printed on less expensive printers and with less exacting print control.

SUMMARY OF THE INVENTION

This invention provides methods and apparatus for selectively processing colors printed, by machine or by hand, on a response sheet so that the same color may be used to print key marks and response targets for OMR or similar processing.

The selective processing may be performed using a physical hardware filter to select the colors being processed in different segments of the sheet by the scanner, or by using software to selectively process colors by selectively interpreting color values, such as red, green, blue (RGB) values, assigned by a full spectrum color scanner.

One embodiment uses a physical filter element located in relation to the form to selectively filter a portion of the form during scanning. A response sheet may have response targets and key marks printed in the same color ink, with one section of the form containing the key marks and another section containing the response targets. The section of the form containing the key marks will be unfiltered and processed by the scanner in the normal fashion. That is, unfiltered white light will be absorbed or reflected off the section containing the key marks so that the section is processed by the scanner and assigned pixel darkness values within a gray scale, usually 0 to 255. In a second section of the sheet containing the response targets, a filter is positioned between the light source and the scanner's sensor so that the light incident on the second section is the color of the response targets. thereby rendering the response targets unreadable in that section. The gray scale values in the key mark section are used to locate the key marks in the captured image which, in turn, can be used to project the location of the response targets areas, but only a mark in the response areas, made by the respondent in a color other than the color of the response targets, will show up as dark pixels.

Another embodiment uses software to selectively process captured images from response sheets having key marks and response targets printed in the same color. There are currently available digital imaging scanners capable of capturing an image of a response sheet with pixel darkness values assigned for three color bands, usually the primary colors red, green and blue (some may use the complimentary colors cyan, magenta, yellow). The assigned pixel darkness values for each of the three colors to each pixel enables a software program to recognize the color of each pixel. This can be used to provide a virtual filter when scanning a response sheet that has key marks and response targets printed in one color. The scanner captures a digital image of the sheet having RGB darkness values assigned for each pixel. That is, each pixel will have a pixel darkness value for red, blue and green. Then using the darkness value that corresponds to the color of the key marks, the system locates the key marks in the captured image. From the key marks, the system can locate, or project an expected location of, the response targets in the image. Then, using the darkness value of another color, the system can identify an intended response mark at the expected location of a target without processing the darkness value of the target itself.

BRIEF DESCRIPTION OF THE DRAWINGS

FIG. 1 is a flow chart of the method steps for using a physical filter to perform OMR on a sheet having key marks and response targets printed in the same color.

FIG. 3 is a schematic diagram of the method steps for using software to selectively process colors when performing OMR on a sheet having key marks and response targets printed in the same color.

DETAILED DESCRIPTION OF THE DEPICTED EMBODIMENTS

Figure 2:
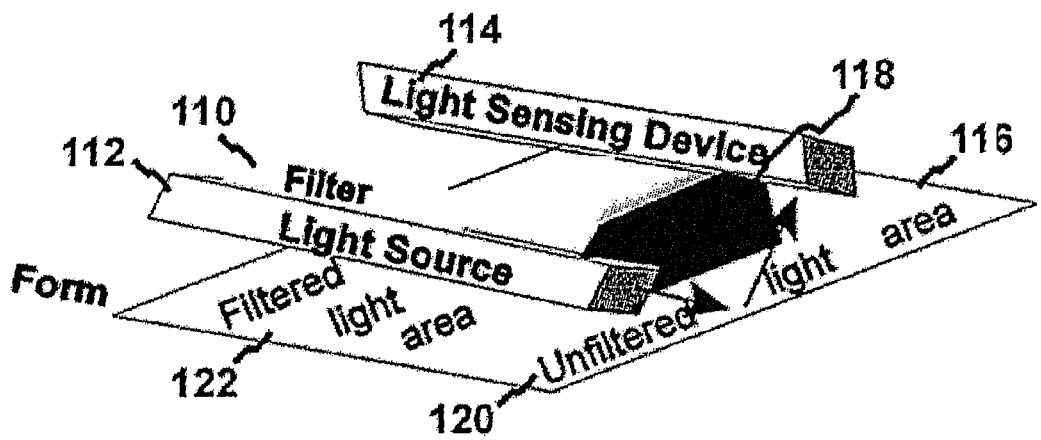
FIG. 2 is a schematic diagram of a physical filter arranged to perform selective filtering of a sheet being scanned by an optical scanner.

Throughout this specification the terms "sheet" and "form" are used interchangeably, and both refer to a document containing one or more areas for a person to respond to a question or instruction by making a mark in an appropriate location on the document. OMR forms for standardized testing are common, but not exclusive examples. As described earlier, these forms may contain printed marks for location, orientation, determination of scanning speed, or document identification by the scanner. These marks will be referred to herein as "key marks", with the understanding that the term includes, in its broad sense, timing tracks and any other type of mark utilized to process, orient, identify and interpret response sheets by optical scanning.

When reading this specification, reference is made to the colors of the visual spectrum. While black is technically not a color, but rather the absence of all color, when the term "color" or "visual spectrum" is used, it is considered to include black. Similarly, white is also not technically a color, but rather the presence of all colors, and is also deemed to be included when reference is made to the term "color" or "visual spectrum."

While the invention described herein will work with non-white sheets, white sheets are used for purposes of describing the invention in this specification.

The invention is described herein in different embodiments to enable one skilled in the art to make and use the invention. No attempt has been made to describe all of the possible embodiments.

FIG. 1 shows the sequence of steps utilized in the embodiment wherein a physical filter is used to perform selective processing during optical scanning of an OMR form on which response targets and key marks are printed in the same color. Such a form, for example, might have red key marks in the form of timing tracks along a side margin of the form, and red response targets in areas of the form inboard of the side margin.

The first step (10) is to provide a digital imaging scanner having a light source and sensor for detecting light reflected off the sheet. The scanner should also be capable of assigning pixel darkness values within the gray scale to the amount of light reflected from discrete areas (pixels) of the sheet. Such scanners are well known, and usually provide a gray scale value to the various colors printed on a sheet from 0 (no reflected light or "black") to 255 ("white"). The colors of the visible spectrum are each converted to shades of gray and assigned a unique value between 0 and 255. For example, when a red, blue or green mark is detected by a scanner, the scanner will assign a gray scale value to the mark of somewhere between 0 and 255.

In a following step (20), a color filter is provided that is appropriate for the color ink used to print the key marks and the response targets. The filter may operate through absorption, reflection, scattering or other principle, but its function is to filter the white light emanating from the scanner so that the light directed onto the sheet (where the filter is positioned so that light is filtered before reaching the sheet) or reflected off the sheet (where the filter is positioned so that light is filtered after reflecting off the sheet) is the same color as the key marks and response targets. The result is that the marks having the same color as the light that passes through the filter are not distinguishable from the sheet itself.

In the next step (30), the filter is arranged in a particular relation to the sheet path through the scanner, such that light reflected from a section of the form containing key marks is not filtered, and light reflected from the response targets is filtered. In the example above, the filter may be placed such that the light is filtered to allow red light to be incident on the section containing the response targets, while white light is allowed to be incident on the margin where the timing tracks or key marks are located. The red key marks will absorb the green and blue components of white light and appear red. The scanner will then convert the red to a shade of gray and assign pixels corresponding to the key marks a relatively low gray scale value indicating a darkness. The sheet will reflect the red light and show up in the images as pixels with gray scale value closer to white, enabling the scanner to accurately detect the key marks. In the section containing the response targets, however, the red light causes the red response targets to appear the same as the white paper, while any other color marks made by the respondent will appear black.

Thus, the sheet is scanned (40) with the digital imaging scanner to produce pixel darkness values for the pixels in the captured digital image of the sheet by assigning a gray scale value to each pixel. The gray scale values are used to locate (50) key marks in the captured image. Then in a following step (60), the location of key marks in the image is used to locate or project an expected location of response targets in the captured image. An expected location of a target may be determined from the specification for the sheet and the variations from the specification of the key marks in the image, as described in pending PCT application PCT/US01/16966, the specification of which is hereby incorporated by reference.

In a following step (70), the gray scale values of pixels in an area at the locations calculated to be the expected locations of each response target are processed to identify response marks. If a blue, green or black response mark is present, it will appear dark, and if no response mark is present, it will appear light. Although the response targets are printed in the same color as the key marks, the filter is arranged so that the response targets appear to be the same as the sheet and are ignored.

FIG. 2 shows how an optical scanner can be modified by placing a filter in an orientation that leaves one edge of the sheet exposed to unfiltered light, while the remainder of the form is exposed to filtered light. A filter (110) is placed between the scanner's light source (112) and its camera or light-sensing device (114). The filter covers most, but not all of the width of the sheet (116) being scanned and will generally correspond to the section of the form having response targets. A light barrier (118) may be added to make a sharp separation of the filtered and unfiltered light.

Using a red filter as an example, the filter (110) may freely pass light in a red band, but absorb or otherwise block the transmittance of other visible light. Then a form (116) can be printed with key marks and response targets in red. The side margin (120) of the sheet that receives unfiltered light from the source (112) can be used as the location of key marks, since, red ink will absorb green and blue band components of the unfiltered white light and appear dark in the image, enabling the scanner to assign it a gray scale value that is distinguishable from the sheet.

The response targets are printed in the selectively filtered area (122) of the sheet, where the filtered red band light reflected off the red ink will be approximately the same as is reflected off the white paper, causing them both to have approximately the same gray scale value. Marks made by a lead pencil, blue pen, green pen, or other such mark that absorbs red light will cause such marks to appear dark in the image and be distinguishable by their pixel darkness values. Thus, the selective placement of a red light filter enables a scanner to read the red key marks in the unfiltered section while ignoring the red response targets of the filtered section.

When a selective filter is added to a scanning system as described above, the filter will generally reduce the total light in the filtered area. Consequently, it may be necessary to compensate by reducing the amount of light in the unfiltered area so that the reflected light reaching the scanner's light sensor is roughly comparable over the form.

Referring now to FIG. 3, an alternative to selective filtering with a physical filter is to use software in conjunction with a color scanner to selectively process the colors within a captured image. In this embodiment, the various colors present on a sheet are assigned as set of pixel darkness values in the primary or complimentary colors. This set enables a software program to selectively process particular colors in particular sections of the sheet. For example, where key marks and response targets are printed in red, the software may be programmed so that the color red is processed in the section of the form having red key marks, while only colors other than red are processed in the section of the form having response targets. Although the response targets are printed in the same color as the key marks, the software is arranged so that the response targets appear to be the same as the sheet and are ignored.

The first step (1000) of FIG. 3 is to provide a digital imaging scanner capable of capturing an image of a response sheet with a set of color values, such as a set of RGB values, assigned to each pixel. Such a scanner records and assigns pixel darkness values for the three primary colors, red, green, and blue for each pixel on the sheet. Collectively, those values can be referred to as a pixel's RGB values. (The term "RBG values" should be understood as a shorthanded expression for primary or complimentary color values; so the complimentary color values would still be referred to as RBG values.) In the case of red ink, the RGB values would show a high red content and a low content for blue and green. Green ink would have a high green content and low for red and blue. Blue ink would have a high blue content and low red and green. A white pixel will have high content for all three primary colors, whereas the RGB value for black marks will have low content for red, green and blue. Examples of scanners capable of properly assigning RGB values range from the HP ScanJet 5100C up to the SCAMA 000 by InoTec.

As in the physical filter alternative described above, the software embodiment allows the key marks and response targets of a response sheet to be printed in the same color ink, while providing even greater flexibility in the amount of colors which may be properly processed as response marks. Step (2000) of the process shown in FIG. 3 is to provide a response sheet having key marks and response targets printed in the same color. That color may be any color in the visual spectrum, including black (or white where a non-white form is used). However, the color selected for the key marks and response targets may not be used by a respondent to make response marks. That is, if blue is used for the key marks and response targets, blue may not be used to make response marks. For this reason, red may be the color of choice for the key marks and response targets because then any color other than red may be used to make response marks including black pencil, black ink, and blue ink.

In a following step (3000), the scanner captures a digital image of the sheet with RGB values assigned to each pixel that corresponds to the color of that pixel. Then, using the RGB values for the color of the key marks, the key marks are located in the captured image (4000).

The next step (5000) is to calculate, based on the location of the key marks in the image, an expected location of response targets in the image. Then in the following step (6000), the RGB values that correspond to the color of the response targets are ignored. The expected target locations are interrogated to determine the presence of RGB values that correspond to any color other than the response target color. Accordingly, any mark in any color other than the response target color made at an expected target location may be properly processed as an intended response.

In this embodiment, computer software is used to selectively process colors on a response sheet using the color's RGB values enabling the key marks and targets to be printed in the same color. The scanner calculates pixel darkness values for red, green and blue so as to provide RGB values for each pixel to locate key marks in the captured image. Based on the location of the key marks, the software calculates an expected location of response targets. The software then processes the RGB values provided by the scanner in any color other than the color of the response targets to identify the presence of marks made by a respondent at the expected location of a target. Again, those marks may be made in any color other than the color of the response targets.

Figure 4:
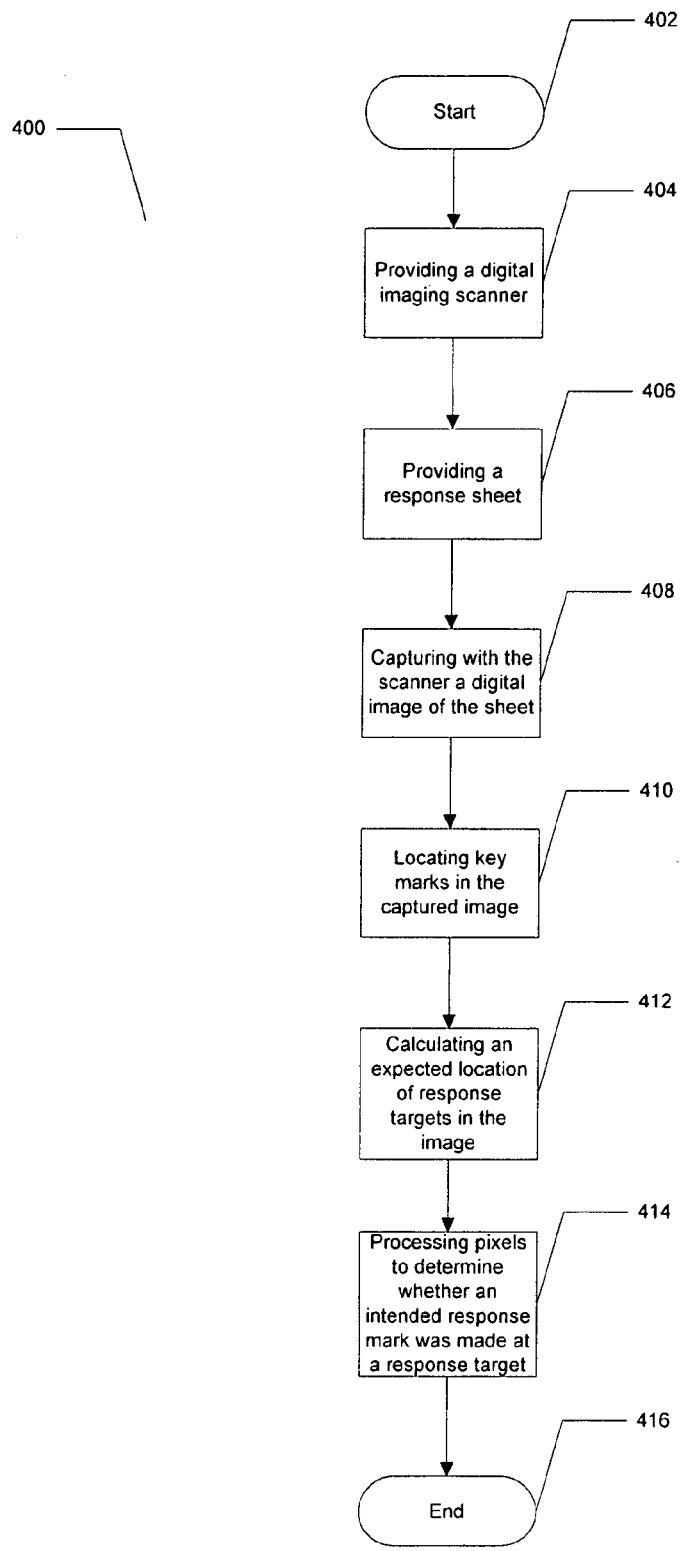
FIG. 4 is a flow chart of the method steps according to one embodiment of the present invention.

FIG. 4 is a flow chart of a method 400 of identifying intended response marks in an optically scanned image of a response sheet having key marks and response targets printed in the same color. The method 400 starts at step 402. The next step 404 is to provide a digital imaging scanner capable of capturing an image of a response sheet with RGB values assigned to each pixel corresponding to the color of that pixel. The following step 406 is to provide a response sheet having key marks and response targets printed in the same color. The subsequent step 408 is to capture, with the scanner, a digital image of the sheet with each pixel having RGB values assigned thereto. The next step 410 is to locate key marks in the captured image by processing pixels having RGB values that correspond to the color of the key marks. The following step 412 is to calculate from the location of the key marks in the image an expected location of response targets in the image. The subsequent step 414 is to process pixels having RGB values corresponding to any color other than the color of the target to determine whether an intended response mark was made at a response target. The method ends at step 416.

Figure 5:
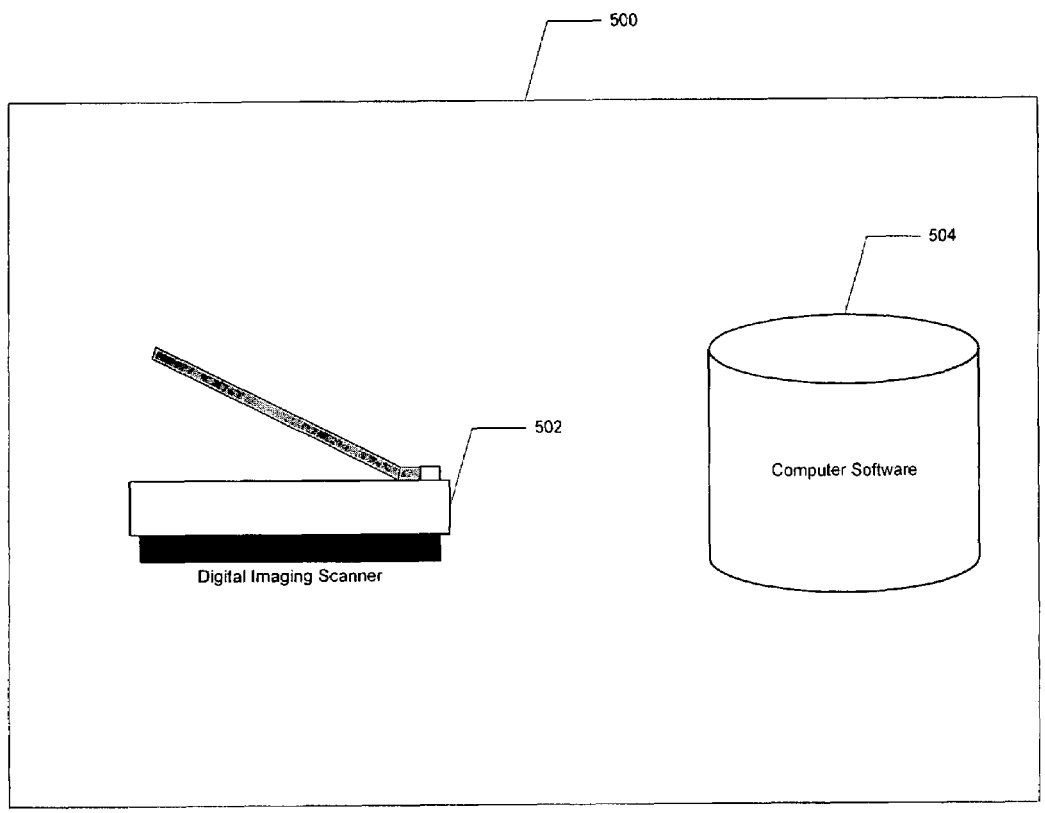
FIG. 5 is a schematic system diagram according to one embodiment of the present invention.

FIG. 5 is a schematic system diagram according to one embodiment of the present invention. The system 500 is for identifying intended response marks in an optically scanned image of a response sheet having key marks and response targets printed in the same color. The system 500 comprises a digital imaging scanner 502 capable of capturing an image of a response sheet with RGB values assigned to each pixel corresponding to the color of that pixel. The system 500 also comprises computer software 504 capable of processing the RGB values that correspond to the color of the key marks to locate key marks in the captured image. The computer software 504 is also capable of calculating from the location of the key marks in the image an expected location of response targets in the image. The computer software 504 is also capable of processing the RGB values that correspond to any color other than the color of the target to identify an intended response mark at the expected location of the target.

While the present invention is quite capable of scanning a sheet having key marks and targets printed in two colors that are in close registration, implementation of the present invention enables the key marks and response targets of response forms to be printed in the same color ink or in two colors not in close registration with each other. Selective processing also facilitates the use of printers that are not capable of keeping two or more colors in close registration for printing response forms. Examples of such devices include single color printing presses, digital duplicators, mimeograph machines, and other devices that can print only one color at a time.

Although embodiments of the invention have been described in detail, it is to be understood that the invention is not limited thereto, and that various changes can be made therein without departing from the spirit and scope of the invention, which is defined by the attached claims.

What is claimed is:

1. A method of identifying intended response marks in an optically scanned image of a response sheet having key marks and response targets printed in the same color, comprising the steps of:
   (a) providing a digital imaging scanner capable of capturing an image of a response sheet with RGB values assigned to each pixel corresponding to the color of that pixel,
   (b) providing a response sheet having key marks and response targets printed in the same color,
   (c) capturing with the scanner a digital image of the sheet with each pixel having RGB values assigned thereto,
   (d) locating key marks in the captured image by processing pixels having RGB values that correspond to the color of the key marks,
   (e) calculating from the location of the key marks in the image an expected location of response targets in the image,
   (f) processing pixels having RGB values corresponding to any color other than the color of the target to determine whether an intended response mark was made at a response target.

2. A method as in claim 1, wherein the response sheet has key marks and response targets printed in red.

3. A system for identifying intended response marks in an optically scanned image of a response sheet having key marks and response targets printed in the same color, comprising:
   (a) a digital imaging scanner capable of capturing an image of a response sheet with RGB values assigned to each pixel corresponding to the color of that pixel,
   (b) a computer-readable medium encoded with computer-executable instructions to process the RGB values that correspond to the color of the key marks to locate key marks in the captured image,
   (c) computer-executable instructions to calculate from the location of the key marks in the image an expected location of response targets in the image, and
   (d) computer-executable instructions to process the RGB values that correspond to any color other than the color of the target to identify an intended response mark at the expected location of the target.

4. A system as in claim 3, wherein the response sheet has key marks and response targets printed in red.

* * * * *